US010668963B2

(12) United States Patent
Kita et al.

(10) Patent No.: US 10,668,963 B2
(45) Date of Patent: Jun. 2, 2020

(54) IDLER WHEEL, CRAWLER-TYPE TRAVEL DEVICE, AND WEAR PLATE

(71) Applicant: KOMATSU LTD., Tokyo (JP)

(72) Inventors: Naoaki Kita, Hirakata (JP); Minoru Katayama, Hirakata (JP); Kenichi Hisamatsu, Hirakata (JP)

(73) Assignee: KOMATSU LTD., Tokyo (JP)

( * ) Notice: Subject to any disclaimer, the term of this patent is extended or adjusted under 35 U.S.C. 154(b) by 576 days.

(21) Appl. No.: 15/121,923

(22) PCT Filed: Apr. 16, 2014

(86) PCT No.: PCT/JP2014/060852
§ 371 (c)(1),
(2) Date: Aug. 26, 2016

(87) PCT Pub. No.: WO2015/159394
PCT Pub. Date: Oct. 22, 2015

(65) Prior Publication Data
US 2017/0066489 A1    Mar. 9, 2017

(51) Int. Cl.
*B62D 55/08* (2006.01)
*B62D 55/14* (2006.01)

(52) U.S. Cl.
CPC .......... *B62D 55/145* (2013.01); *B62D 55/08* (2013.01)

(58) Field of Classification Search
CPC ....... B62D 55/145; B62D 55/14; B62D 55/08
See application file for complete search history.

(56) References Cited

U.S. PATENT DOCUMENTS 3,869,931 A * 3/1975 Boggs ................. B62D 55/145
                                                                    305/119
9,902,443 B2 * 2/2018 Kita ..................... B62D 55/145
(Continued)

FOREIGN PATENT DOCUMENTS

EP      0 336 590 A2    10/1989
JP      50-47133 U       5/1975
(Continued)

OTHER PUBLICATIONS

The International Search Report for the corresponding international application No. PCT/JP2014/060852, dated Jul. 15, 2014.
(Continued)

*Primary Examiner* — Scott A Browne
(74) *Attorney, Agent, or Firm* — Global IP Counselors, LLP

(57) ABSTRACT

An idler wheel includes a disk shaped idler body, and a plurality of wear plate assemblies disposed to encircle a circumferential surface of the idler body. Each wear plate assembly includes a first wear plate and a second wear plate. The first and second wear plates are adjacent to each other. Each of the first and second wear plates includes a first crawler belt contact surface and a second crawler belt contact surface. Each of the first wear plates includes a first end part that defines an end on a second wear plate side of the first crawler belt contact surface as seen in a plan view, and a second end part that defines an end on the second wear plate side of the second crawler belt contact surface as seen in the plan view. The first end part is inclined with respect to an axial direction.

20 Claims, 12 Drawing Sheets

(56) References Cited

U.S. PATENT DOCUMENTS

| | | | |
|---|---|---|---|
| 2004/0017108 A1* | 1/2004 | Moebs | B62D 55/096 |
| | | | 305/125 |
| 2009/0212500 A1 | 8/2009 | Kometani | |
| 2010/0072813 A1* | 3/2010 | McRae | B62D 55/14 |
| | | | 305/120 |
| 2010/0102623 A1 | 4/2010 | Mulligan | |
| 2010/0133898 A1* | 6/2010 | Johannsen | B62D 55/0966 |
| | | | 305/137 |
| 2010/0270856 A1 | 10/2010 | Maeda et al. | |
| 2012/0153713 A1 | 6/2012 | Yelistratov | |

FOREIGN PATENT DOCUMENTS

| | | |
|---|---|---|
| JP | 61-3082 U | 1/1986 |
| JP | 1-278890 A | 11/1989 |
| JP | 2007-333141 A | 12/2007 |
| WO | 2009/101836 A1 | 8/2009 |

OTHER PUBLICATIONS

The Office Action for the corresponding German application No. 11 2014 006 5915, dated Feb. 2, 2018.
The Office Action for the corresponding Chinese application No. 201480076986.9, dated May 18, 2017.

* cited by examiner

IDLER WHEEL, CRAWLER-TYPE TRAVEL DEVICE, AND WEAR PLATE

CROSS-REFERENCE TO RELATED APPLICATIONS

This application is a U.S. National stage application of International Application No. PCT/JP2014/060852, filed on Apr. 16, 2014.

BACKGROUND

Field of the Invention

The present invention relates to an idler wheel, a crawler-type travel device, and a wear plate.

Background Information

Conventionally, a crawler-type travel device provided with a crawler belt wound onto an idler wheel and a drive wheel has been widely used in work machines such as bulldozers.

A method for encircling a disk-like idler wheel with a plurality of arc-like wear plates has been proposed (see Japanese Unexamined Patent Application Publication No. H1-278890.). The wear plates are fixed with fixing members disposed on the wear plates. The wear plates have a crawler belt contact surface provided on both sides of the fixing member, and the fixing member is formed in a flange-like manner so that the rail surfaces of the crawler belt abut the crawler belt contact surface.

SUMMARY

The abutting portions of the crawler belt and the wear plates make surface contact in a region having a very small width substantially parallel to the axis due to the planar tread surface abutting the arc-like crawler belt contact surface. It is possible that these abutting portions may move in the circumferential direction over the crawler belt contact surface and the wear plates may wear away at the abutting portions.

Because the end sides of the crawler belt contact surface are parallel in the axial direction in Japanese Unexamined Patent Application Publication No. H1-278890, the contact surface area of the crawler belt and the wear plates decreases and the abutting portions approach a state of linear contact when the abutting portions move over the crawler belt contact surface to reach the end side. As a result, the load pressure applied near the end side increases dramatically which may promote local wear near the end sides.

The present invention takes the above condition into consideration and aims to provide an idler wheel, a crawler-type travel device, and a wear plate that are able to limit local wear of the wear plates.

An idler wheel according to a first aspect of the present invention is one having a crawler belt wound thereon. The idler wheel is provided with a disk-like idler body having a rotational center axis, and a plurality of wear plate assemblies disposed so as to encircle the circumferential surface of the idler body. The plurality of wear plate assemblies include a first wear plate and a second wear plate adjacent to each other. The first wear plate and the second wear plate each include a first crawler belt contact surface and a second crawler belt contact surface. The first wear plate includes a first end part which defines an end on the second wear plate side of the first crawler belt contact surface, and a second end part which defines an end on the second wear plate side of the second crawler belt contact surface, as seen in a plan view. The first end part is inclined with respect to the axial direction.

The idler wheel according to the first aspect is able to limit linear contact between the crawler belt and the first crawler belt contact surface in comparison to when the first end part is parallel to the axial direction. Therefore, local wear near the first end part can be suppressed because the load pressure applied near the first end part is reduced.

An idler wheel according to a second aspect of the present invention is related to the first aspect and the second end part is inclined with respect to the axial direction.

The idler wheel according to the second aspect is able to limit linear contact between the crawler belt and the second crawler belt contact surface in comparison to when the second end part is parallel to the axial direction. Therefore, local wear near the second end part can be limited because the load pressure applied near the second end part is reduced.

An idler wheel according to a third aspect of the present invention is related to the first or second aspect, and the second wear plate includes a third end part which defines an end on the first wear plate side of the first crawler belt contact surface, and a fourth end part which defines an end on the first wear plate side of the second crawler belt contact surface, as seen in a plan view. The third end part is inclined with respect to the axial direction.

The idler wheel according to the third aspect is able to limit linear contact between the crawler belt and the first crawler belt contact surface in comparison to when the third end part is parallel to the axial direction. Therefore, local wear near the third end part can be limited because the load pressure applied near the third end part is reduced.

An idler wheel according to a fourth aspect of the present invention is related to the third aspect and the fourth end part is inclined with respect to the axial direction.

The idler wheel according to the fourth aspect is able to limit linear contact between the crawler belt and the second crawler belt contact surface in comparison to when the fourth end part is parallel to the axial direction. Therefore, local wear near the fourth end part can be limited because the load pressure applied near the fourth end part is reduced.

An idler wheel according to a fifth aspect of the present invention is related to the fourth aspect, and the first end part and the third end part exhibit point symmetry on the basis of a predetermined center point of symmetry as seen in a plan view, and the second end part and the fourth end part exhibit point symmetry on the basis of a predetermined center point of symmetry as seen in a plan view.

Productivity of the wear plates can be improved because the contours of the first wear plate and the second wear plate are the same due to the idler wheel according to the fifth aspect.

A crawler-type travel device according to a sixth aspect of the present invention is provided with a track frame, a sprocket wheel disposed in front of or to the rear of the track frame, the idler wheel described in any one of the first to fifth aspects disposed on the opposite side of the sprocket wheel with the track frame interposed therebetween, and a crawler belt wound onto the sprocket wheel and the idler wheel.

A wear plate according to a seventh aspect of the present invention is attached to a disk-like idler body having a rotational center axis, and abuts a crawler belt. The wear plates have a first crawler belt contact surface and a second crawler belt contact surface. A first end part of the first crawler belt contact surface in the circumferential direction around the rotational center axis is inclined with respect to the axial direction as seen in a plan view of the first crawler belt contact surface.

The idler wheel according to the seventh aspect is able to limit linear contact between the crawler belt and the first crawler belt contact surface in comparison to when the first end part is parallel to the axial direction. Therefore, local wear near the first end part can be limited because the load pressure applied near the first end part is reduced.

According to the present invention, an idler wheel, a crawler-type travel device, and a wear plate that are able to limit local wear of the wear plate can be provided.

DESCRIPTION OF EMBODIMENTS

Hereinbelow, a configuration of a crawler-type travel device provided with an idler wheel according to an embodiment will be discussed with reference to the drawings. In the following discussion, "up," "down," "front," and "rear" are terms based on the perspective of an operator seated in the operator's seat of the work machine to which the crawler-type travel device is attached. Moreover, "inside" and "outside" are terms based on the center line in the width direction of the work machine to which the crawler-type travel device is attached.

(Configuration of Crawler-Type Travel Device 1)

Figure 1:
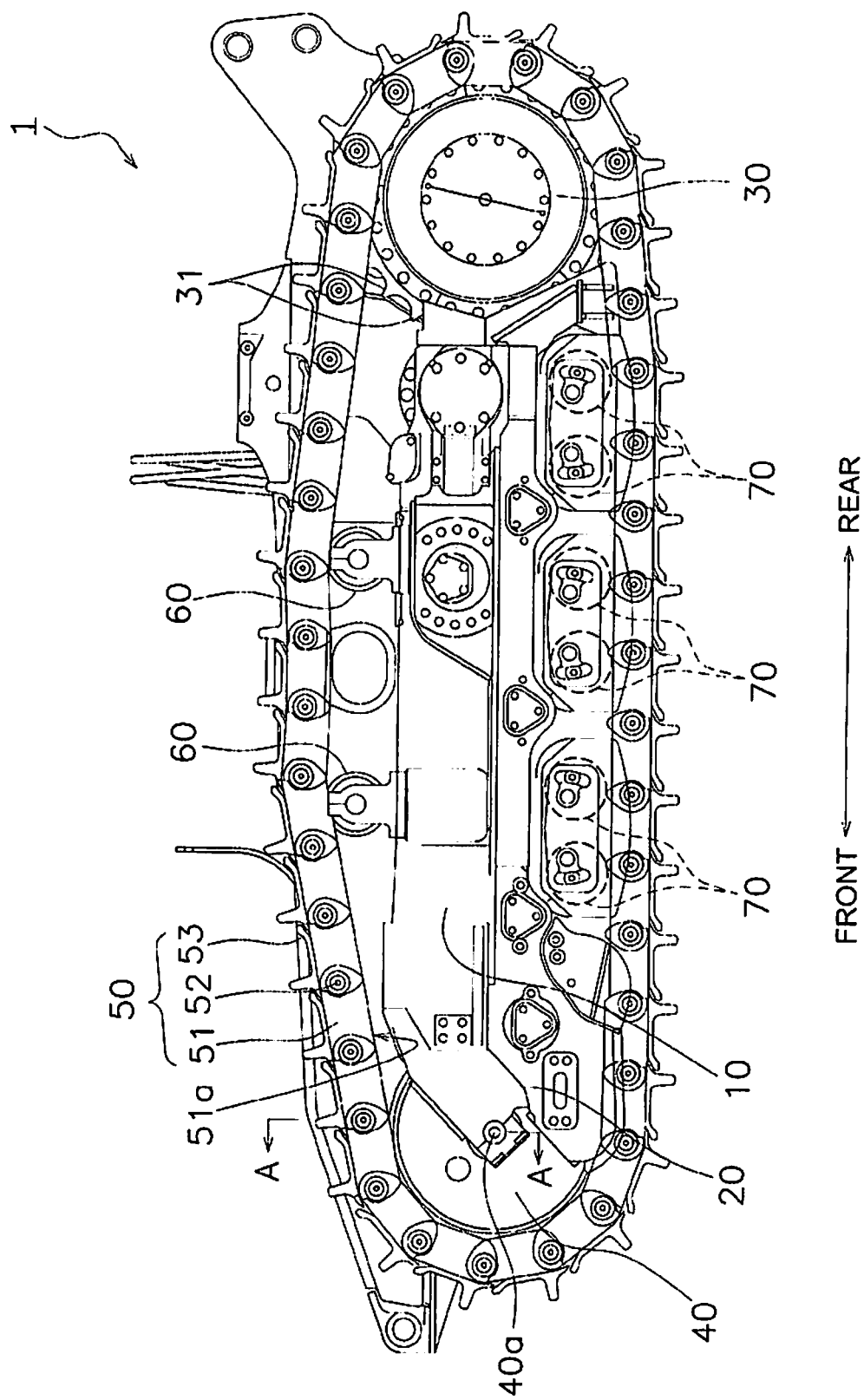
FIG. 1 is a side view of a crawler-type travel device.

FIG. 1 is a side view of a crawler-type travel device 1 according to an embodiment. The crawler-type travel device 1 is provided with a track frame 10, an idler movement mechanism 20, a sprocket wheel 30, an idler wheel 40, a crawler belt 50, two carrier rollers 60, and six track rollers 70.

The track frame 10 is a framework of a vehicle body of a work machine (for example, a bulldozer or an excavator and the like) which is not shown in the drawings. The track frame 10 extends in the front-back direction.

The idler movement mechanism 20 is attached at the front end part of the track frame 10. The idler movement mechanism 20 is able to move forward and backward with respect to the track frame 10. The idler movement mechanism 20 regulates the tension of the crawler belt 50 which fluctuates in accordance to the shape of the ground surface by changing the position of the idler wheel 30 with respect to the sprocket wheel 20 while the crawler-type travel device 1 is traveling.

The sprocket wheel 30 is disposed to the rear of the track frame 10. The sprocket wheel 30 rotates and drives due to a hydraulic motor which is not shown in the drawings. The crawler belt 50 is wound onto the sprocket wheel 30. The sprocket wheel 30 has teeth 31 which mesh with the crawler belt 50.

The idler wheel 40 is disposed in front of the track frame 10. The idler wheel 40 is supported in a rotatable manner by the idler movement mechanism 20. The idler wheel 40 is attached to the idler movement mechanism 20 via a support shaft 40a. The crawler belt 50 is wound onto the idler wheel 40. The configuration of the idler wheel 40 is described below.

The crawler belt 50 is wound onto the sprocket wheel 30 and the idler wheel 40. The crawler-type travel device 1 travels due to the crawler belt 50 moving in a circular manner due to the rotational driving of the sprocket wheel 30. The crawler belt 50 has a plurality of track links 51, a plurality of shaft bearing parts 52, and a plurality of shoe plates 53. Two adjacent track links 51 are linked in a pivotable manner by a shaft bearing part 52. The track links 51 each have rail surfaces 51a which exhibit right-left symmetry. The right-left symmetrical rail surfaces 51a come into contact with first and second crawler belt contact surfaces 200a, 200b of a wear plate 200 which is described below. The rail surfaces 51a are formed in a substantially planar manner. The shaft bearing parts 52 are each configured by a pin which passes through two adjacent track links 51 and a bushing which is externally engaged with the pin.

The two carrier rollers 60 are disposed on the upper side of the track frame 10. The carrier rollers 60 guide the crawler belt 50 from below. The two carrier rollers 60 are spaced away from each other in the front-back direction. The carrier rollers 60 turn in response to contact with the crawler belt 50.

The six track rollers 70 are disposed on the lower side of the track frame 10. The six track rollers 70 distribute the vehicle body weight applied to the crawler belt 50. The six track rollers 70 are spaced away from each other in the front-back direction. The track rollers 70 turn in response to contact with the crawler belt 50.

(Configuration of Idler Wheel 40)

Figure 2:
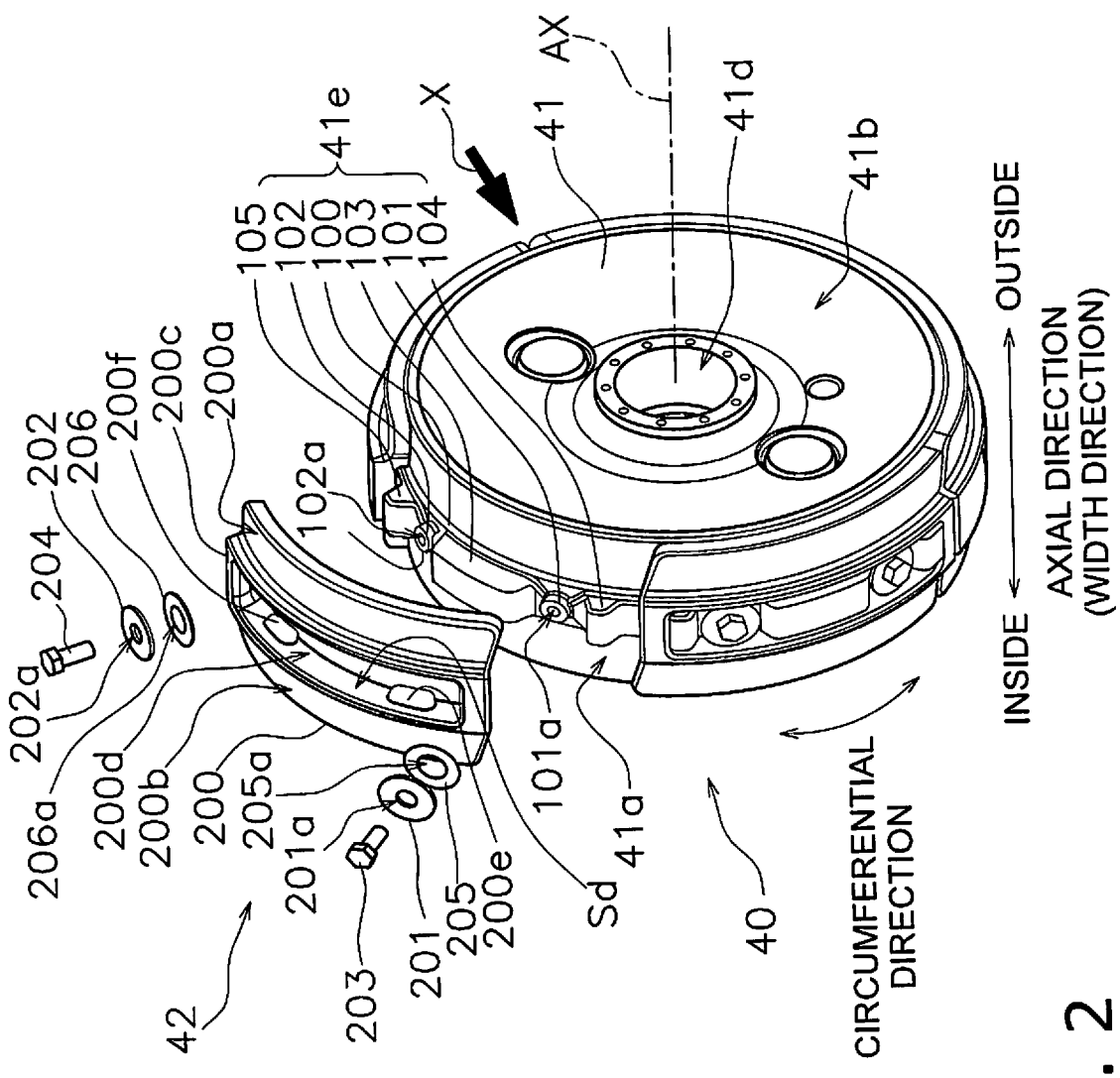
FIG. 2 is a perspective view of an idler wheel.
Figure 3:
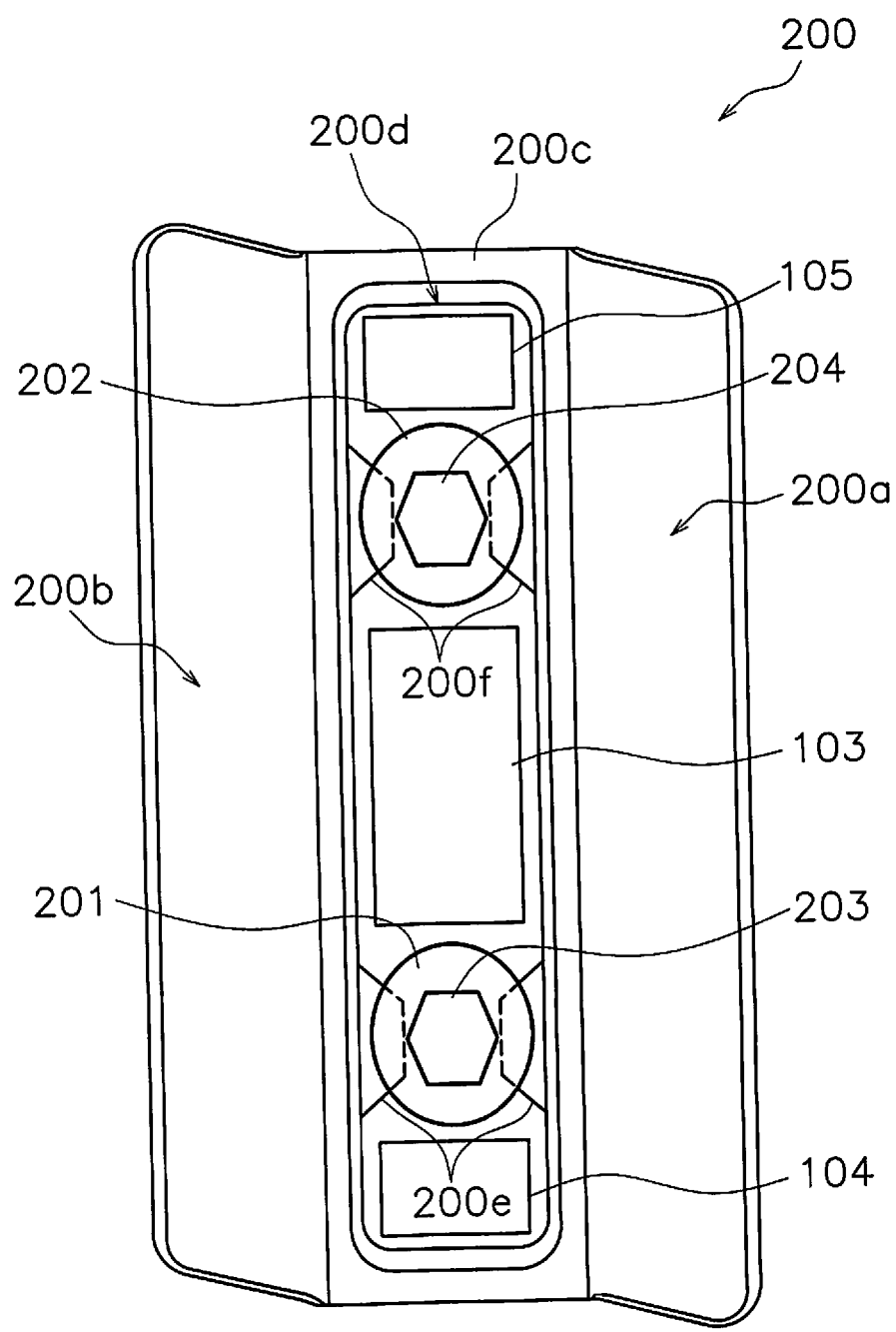
FIG. 3 is a plan view of a wear plate assembly.
Figure 4:
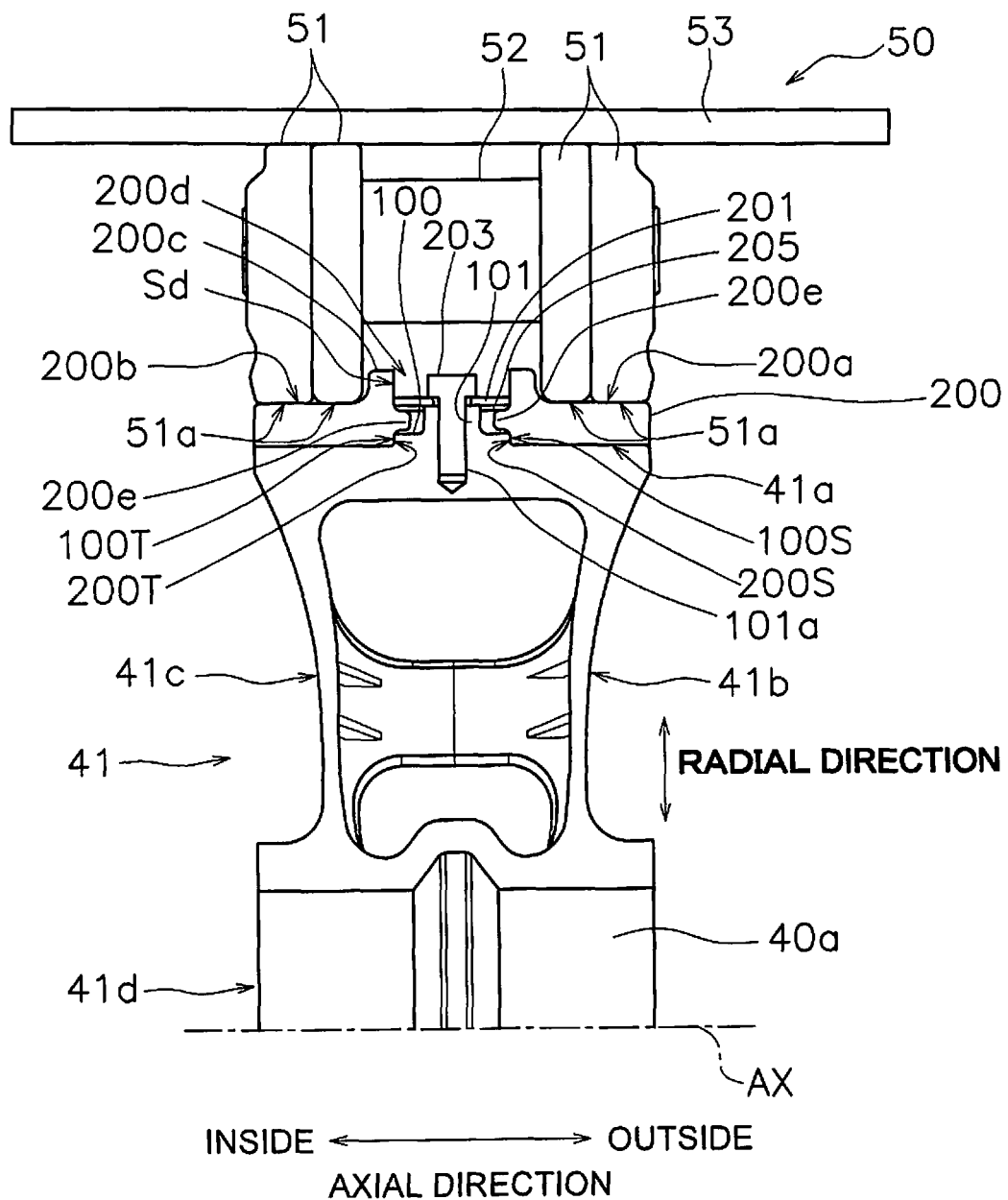
FIG. 4 is a sectional view along line A-A of FIG. 1.

FIG. 2 is a perspective view of the idler wheel 40. FIG. 3 is a plan view of a wear plate assembly 42. FIG. 4 is sectional view along line A-A in FIG. 1. In FIG. 2, one wear plate assembly 42 is illustrated in a dismantled state in order to discuss the configuration of the idler wheel 40.

The idler wheel 40 is provided with an idler body 41 and five wear plate assemblies 42.

The idler body 41 is formed in a disk-like manner having a rotational center axis AX. The idler body 41 has a circumferential surface 41a, an outer surface 41b, and inner surface 41c, an insertion hole 41d, and a protruding part 41e.

The circumferential surface 41a represents the entire side surface of the idler body 41. The outer surface 41b is joined to the circumferential surface 41a. The outer surface 41b is the surface disposed in the outward orientation in the width direction when the crawler-type travel device 1 is attached to the work machine. The inner surface 41c is joined to the circumferential surface 41a. The inner surface 41c is provided on the opposite side of the outer surface 41b. The inner surface 41c is the surface disposed in the inward orientation in the width direction when the crawler-type travel device 1 is attached to the work machine. The insertion hole 41d is formed along the rotational center axis AX in the center of the idler body 41. As illustrated in FIG. 4, the support shaft 40a is inserted into the insertion hole 41d.

The protruding part 41e is formed on the circumferential surface 41a. The protruding part 41e is disposed inside an opening section 200d of the wear plate 200 described below. The protruding part 41e has a support part 100, a first boss 101, a second boss 102, a first island part 103, a second island part 104, and a third island part 105.

The support part 100 is formed so as to extend in the circumferential direction around the rotational center axis AX. In the present embodiment, the support part 100 is formed in a toric manner. That is, the support part 100 is formed continuously over the entire circumference of the circumferential surface 41a. The support part 100 supports the wear plate 200 so as to prevent shifting in the axial direction of the rotational center axis AX (that is, the width direction) when a force is applied to the wear plate 200 from the crawler belt 50 in the axial direction.

As illustrated in FIG. 4, the support part 100 includes a first support surface 100S and a second support surface 100T. The first support surface 100S is provided perpendicular to the axial direction of the rotational center axis AX. The first support surface 100S is formed in an arc-like manner extending in the circumferential direction. The second support surface 100T is provided perpendicular to the axial direction of the rotational center axis AX. The second support surface 100T is formed in an arc-like manner extending in the circumferential direction. The first support surface 100S is provided on the opposite side of the second support surface 100T. The first support surface 100S and the second support surface 100T may be referred to as an "abutted surface" because the surfaces abut with the wear plate 200.

The first boss 101 is formed in an integrated manner on the support part 100. The first boss 101 is disposed between the first island part 103 and the second island part 104 in the circumferential direction. The first boss 101 is formed in a truncated cone shape. A first fastening tool 203 described below is inserted into the first boss 101. As illustrated in FIG. 4, a first fastening hole 101a into which the first fastening tool 203 is inserted passes through the first boss 101 and the support part 100 to reach the idler body 41. The first fastening hole 101a is formed in the radial direction relative to the rotational center axis AX.

The second boss 102 is formed in an integrated manner on the support part 100. The second boss 102 is disposed between the first island part 103 and the third island part 105 in the circumferential direction. The second boss 102 is formed in a truncated cone shape. A second fastening tool 204 described below is inserted into the second boss 102. A second fastening hole 102a into which the second fastening tool 204 is inserted passes through the second boss 102 and the support part 100 to reach the idler body 41 in the same way as the first fastening hole 101a. The second fastening hole 102a is formed in the radial direction.

The first to third island parts 103 to 105 are formed integrally on the support part 100. The first to third island parts 103 to 105 are each formed in a trapezoidal shape. The first island part 103 is disposed between the first boss 101 and the second boss 102 in the circumferential direction. The second island part 104 is formed on the opposite side of the first island part 103 with the first boss 101 interposed therebetween. The third island part 105 is formed on the opposite side of the first island part 103 with the second boss 102 interposed therebetween. In the present embodiment, the first to third island parts 103 to 105 do not abut with the wear plate assemblies 42.

The five wear plate assemblies 42 are disposed in order to encircle the circumferential surface 41a of the idler body 41. The five wear plate assemblies 42 each have the wear plate 200, a first fixing plate (first fixing member) 201, a second fixing plate (second fixing member) 202, the first fastening tool 203, the second fastening tool 204, a first cushioning member 205, and a second cushioning member 206.

The wear plate 200 is an arc-like plate member as seen in the width direction. The wear plate 200 may be configured, for example, from a steel plate and the like. As illustrated in FIGS. 2 to 4, the wear plate 200 has a first crawler belt contact surface 200a, a second crawler belt contact surface 200b, a guide part 200c, the opening part 200d, a pair of first locking parts 200e, and a pair of second locking parts 200f. The planar shape of the wear plate 200 will be described below.

The first crawler belt contact surface 200a is the circumferential surface on the outside in the width direction of the wear plate 200. The second crawler belt contact surface 200b is the circumferential surface on the inside in the width direction of the wear plate 200. The first and second crawler belt contact surfaces 200a and 200b are both formed in an arc-like manner extending in the circumferential direction. The first crawler belt contact surface 200a is formed on the opposite side of the second crawler belt contact surface 200b with the guide part 200c interposed therebetween.

As illustrated in FIG. 4, the first and second crawler belt contact surfaces 200a and 200b both come into contact with the pair of rail surfaces 51a of the track links 51 of the crawler belt 50. As a result, the first and second crawler belt contact surfaces 200a and 200b wear easily and the first and second crawler belt contact surfaces 200a and 200b are preferably subjected to hardening using a hardening technique such as quenching processing, carburization, or nitriding or a surface treatment technique such as physical vapor deposition (PVD), chemical vapor deposition (CVD), or ion coating and the like. Specifically, the first and second crawler belt contact surfaces 200a and 200b preferably have a hardness HRC of 45 or greater.

The first and second crawler belt contact surfaces 200a and 200b are examples of a crawler belt contact surface which comes into contact with the track links 51 of the crawler belt 50. The shape and size of the first and second crawler belt contact surfaces 200a and 200b may be modified as appropriate.

The guide part 200c is formed between the first and second crawler belt contact surfaces 200a and 200b. The guide part 200c extends in the circumferential direction. The guide part 200c protrudes to the outside in the radial direction further than the first and second crawler belt contact surfaces 200a and 200b. As illustrated in FIG. 4, the guide part 200c is a flange that guides the track links 51 so as to suitably abut with the first and second crawler belt contact surfaces 200a and 200b.

The opening part 200d is formed in the guide part 200c. The opening part 200d extends in the circumferential direction. The protruding part 41e of the idler body 41 is disposed inside the opening part 200d. Moreover, the first fixing plate 201, the second fixing plate 202, the first fastening tool 203, the second fastening tool 204, the first cushioning member 205, and the second cushioning member 206 are disposed inside the opening part 200d. The opening part 200d has an inner side surface Sd.

As illustrated in FIG. 4, the inner side surface Sd includes a first abutting surface 200S and a second abutting surface 200T. The first abutting surface 200S and the second abutting surface 200T are the regions of the inner side surface Sd nearest the idler body 41 in the radial direction. The first abutting surface 200S is provided perpendicular to the axial direction. The first abutting surface 200S is formed in an arc-like manner extending in the circumferential direction. The second abutting surface 200T is provided perpendicular to the axial direction. The second abutting surface 200T is formed in an arc-like manner extending in the circumferential direction. The first abutting surface 200S is provided so as to face the second abutting surface 200T in the axial direction. The first abutting surface 200S abuts the first support surface 100S of the support part 100. The second abutting surface 200T abuts the second support surface 100T of the support part 100.

In this way, the wear plate 200 does not shift even when a force in the axial direction is applied by the crawler belt 50 due to the first abutting surface 200S and the second abutting surface 200T abutting the idler body 41.

The pair of first locking parts 200e are formed on the inner side surface Sd of the opening part 200d. The pair of first locking parts 200e are disposed on the outside in the radial direction of the first and second abutting surfaces 200S and 200T on the inner side surface Sd. The pair of first locking parts 200e protrude inside the opening part 200d. As illustrated in FIG. 4, the pair of first locking parts 200e are formed symmetrically around the first fastening tool 203. Each of the pair of first locking parts 200e is disposed on the support part 100 of the idler body 41. Each of the pair of first locking parts 200e is spaced away from the first boss 101 of the idler body 41.

The pair of second locking parts 200f are formed on the inner side surface Sd of the opening part 200d. The pair of second locking parts 200f are spaced away from the pair of first locking parts 200e in the circumferential direction. The pair of second locking parts 200f are disposed on the outside in the radial direction of the first and second abutting surfaces 200S and 200T on the inner side surface Sd. The pair of second locking parts 200f protrude inside the opening part 200d. The pair of second locking parts 200f are formed symmetrically around the second fastening tool 204 in the same way as the pair of first locking parts 200e. Each of the pair of second locking parts 200f is disposed on the support part 100 of the idler body 41. Each of the pair of second locking parts 200f is spaced away from the second boss 102 of the idler body 41.

The first fixing plate 201 is a plate-like annular member for fixing the wear plate 200 to the idler body 41. The first fixing plate 201 has an insertion hole 201a into which the first fastening tool 203 is inserted. The first fixing plate 201 is fastened to the idler body 41 by the first fastening tool 203. The first fastening tool 203 is inserted into the first fastening hole 101a of the idler body 41. The material, shape or size of the first fastening tool 203 is not limited in particular so long as the first fixing plate 201 can be fixed to the idler body 41. The first fastening tool 203 is a bolt in the present embodiment.

The second fixing plate 202 is a plate-like annular member for fixing the wear plate 200 to the idler body 41. The second fixing plate 202 has an insertion hole 202a into which the second fastening tool 204 is inserted. The second fixing plate 202 is fastened to the idler body 41 by the second fastening tool 204. The second fastening tool 204 is inserted into the second fastening hole 102a of the idler body 41. The material, shape or size of the second fastening tool 204 is not limited in particular so long as the second fixing plate 202 can be fixed to the idler body 41. The second fastening tool 204 is a bolt in the present embodiment.

The first cushioning member 205 is disposed between the pair of first locking parts 200e and the first fixing plate 201. The material, shape, or size of the first cushioning member 205 is not limited in particular so long as direct contact of the pair of first locking parts 200e with the first fixing plate 201 can be suppressed. The first cushioning member 205 has a through hole 205a through which the first fastening tool 203 is inserted. While a disk spring is used as the first cushioning member 205 in the present embodiment, a toric rubber plate or a general-use O-ring may be used in place of the disk spring.

The second cushioning member 206 is disposed between the pair of second locking parts 200f and the second fixing plate 202. The material, shape, or size of the second cushioning member 206 is not limited in particular so long as direct contact of the pair of first locking parts 200f with the second fixing plate 202 can be suppressed. The second cushioning member 206 has a through hole 206a through which the second fastening tool 204 is inserted. While a disk spring is used as the second cushioning member 206 in the present embodiment, a toric rubber plate or a general use O-ring may be used in place of the disk spring.

(Planar Shape of Wear Plate 200)

Figure 5:
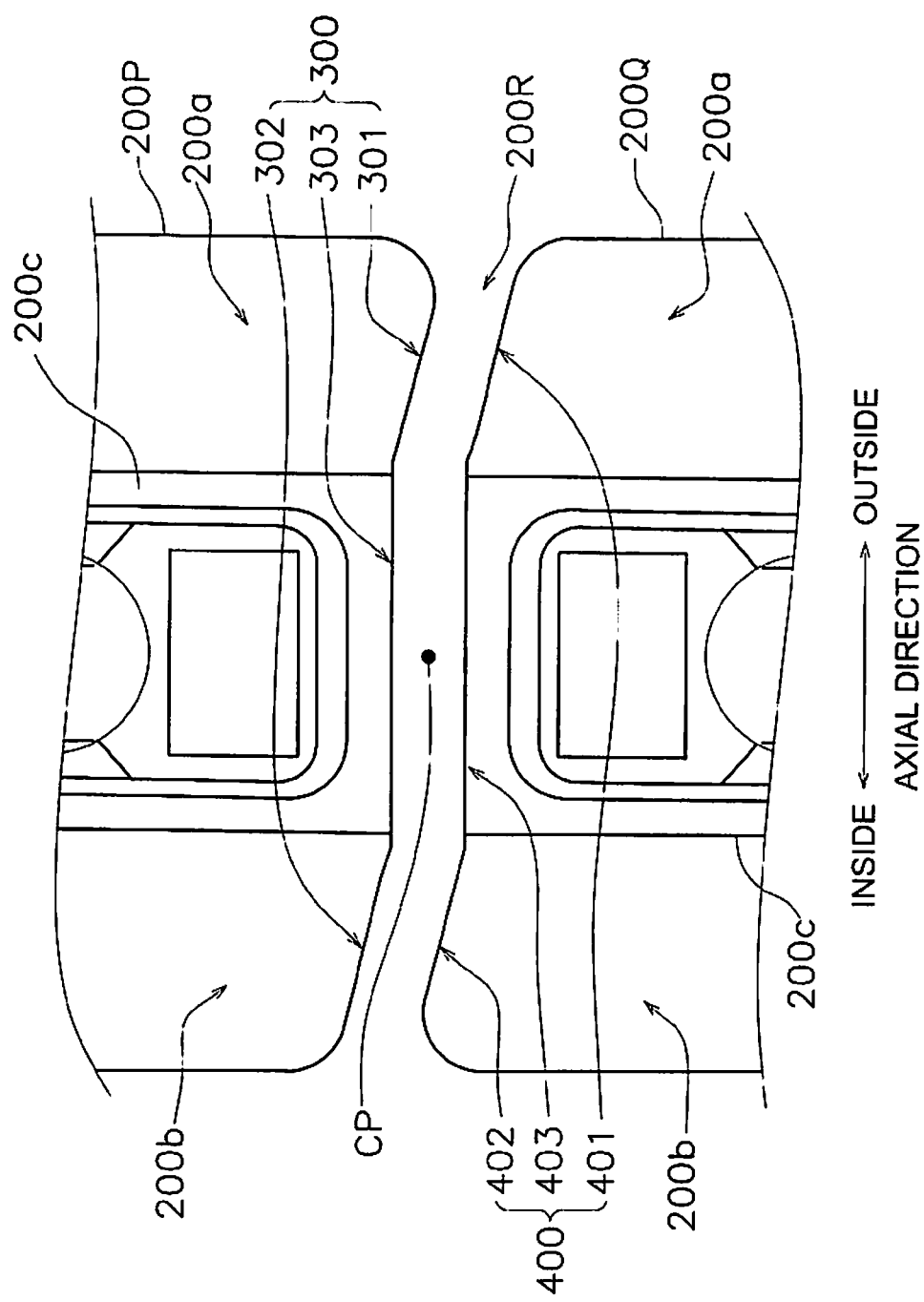
FIG. 5 is a fragmentary view as seen in the direction of arrow X in FIG. 2.

Next, the planar shape of the wear plate 200 will be discussed with reference to the drawings. FIG. 5 is a fragmentary view of a wear plate assembly 42 as seen in the direction of arrow X in FIG. 2. Two adjacent wear plates 200 are depicted in FIG. 5. In the following discussion, one of the two adjacent wear plates 200 is a first wear plate 200P and the other is a second wear plate 200Q. The planar shape of the wear plates 200 in the following discussion is common to all five of the wear plates 200.

The first wear plate 200P has a first end side 300 which defines the end on the first wear plate 200Q side as seen in a plan view of the first wear plate 200P. The term "defines" in the present embodiment signifies the determination of the contour of a member or a region. The first end side 300 opposes the second wear plate 200Q with a predetermined gap therebetween. The first end side 300 includes a first end part 301, a second end part 302, and a first middle part 303.

The first end part 301 defines the endmost edge on the second wear plate 200Q side of the first crawler belt contact surface 200a. The first end part 301 is positioned to the outside of the first middle part 303. That is, the first end part 301 is positioned furthest to the outside within the first end side 300 when the crawler-type travel device 1 is attached to the work machine. The first end part 301 is provided in a linear manner in the present embodiment. The first end part 301 is inclined with respect to the axial direction. The first end part 301 extends in the direction orthogonal to the axial direction.

The phrase "a certain side R is inclined with respect to the axial direction" in the present embodiment signifies that the side R forms an angle larger than zero with respect to the rotational center axis AX when the side R is seen from outside in the radial direction. That is, the phrase "the side R is inclined with respect to the axial direction" signifies that the side R is not parallel to the rotational center axis AX when the side R is seen from outside in the radial direction.

The second end part 302 defines the endmost edge on the second wear plate 200Q side of the second crawler belt contact surface 200b. The second end part 302 is positioned on the inside of the first middle part 303. That is, the second end part 302 is positioned furthest to the inside within the first end side 300 when the crawler-type travel device 1 is attached to the work machine. The second end part 302 is provided in a linear manner in the present embodiment. The second end part 302 is inclined with respect to the axial direction. The second end part 302 extends in the direction orthogonal to the axial direction. The second end part 302 is parallel to the first end part 301 in the present embodiment.

The first middle part 303 is provided between the first end part 301 and the second end part 302, and is joined to both end parts. The first middle part 303 is positioned in the middle of the first end side 300 and defines an endmost edge of the portion of the first end side 300 between the first end part 301 and the second end part 302. The first middle part 303 is provided in a linear manner in the present embodiment. The first middle part 303 is parallel to the axial direction. The first middle part 303 extends along the axial direction. Therefore, the first middle part 303 is inclined with respect to the first end part 301 and the second end part 302.

The second wear plate 200Q has a second end side 400 which defines the end on the first wear plate 200P side as seen in a plan view of the second wear plate 200Q. The second end side 400 includes a third end part 401, a fourth end part 402, and a second middle part 403.

The third end part 401 defines the end on the first wear plate 200P side of the first crawler belt contact surface 200a. The third end part 401 is positioned to the outside of the second middle part 403. That is, the third end part 401 is positioned furthest to the outside within the second end side 400 when the crawler-type travel device 1 is attached to the work machine. The third end part 401 is provided in a linear manner in the present embodiment. The third end part 401 is inclined with respect to the axial direction. The third end part 401 extends in the direction orthogonal to the axial direction.

The fourth end part 402 defines the end on the first wear plate 200P side of the second crawler belt contact surface 200b. The fourth end part 402 is positioned to the inside of the second middle part 403. That is, the fourth end part 402 is positioned furthest to the inside within the second end side 400 when the crawler-type travel device 1 is attached to the work machine. The fourth end part 402 is provided in a linear manner in the present embodiment. The fourth end part 402 is inclined with respect to the axial direction. The fourth end part 402 extends in the direction orthogonal to the axial direction. The fourth end part 402 is parallel to the third end part 401 in the present embodiment.

The second middle part 403 is provided between the third end part 401 and the fourth end part 402, and is joined to both end parts. The second middle part 403 is positioned in the middle of the second end side 400. The second middle part 403 is provided in a linear manner in the present embodiment. The second middle part 403 is parallel to the axial direction. The second middle part 403 extends along the axial direction. Therefore, the second middle part 403 is inclined with respect to the third end part 401 and the fourth end part 402.

The second end side 400 of the second wear plate 200Q follows the first end side 300 of the first wear plate 200P in the present embodiment. Specifically, the first end part 301 of the first end side 300 is parallel to the third end part 401 of the second end side 400. The second end part 302 of the first end side 300 is parallel to the fourth end part 402 of the second end side 400. The first middle part 303 of the first end side 300 is parallel to the second middle part 403 of the second end side 400.

Therefore, the first end side 300 and the second end side 400 exhibit point symmetry on the basis of a center of symmetry CP. The center of symmetry CP is positioned in approximately the middle of a gap 200R between the first wear plate 200P and the second wear plate 200Q. The first end part 301 of the first end side 300 and the fourth end part 402 of the second end side 400 exhibit point symmetry on the basis of the center of symmetry CP, and the second end part 302 of the first end side 300 and the third end part 401 of the second end side 400 exhibit point symmetry on the basis of the center of symmetry CP.

Moreover, because the first end side 300 and the second end side 400 exhibit point symmetry, the planar shape of the gap 200R also exhibits point symmetry on the basis of the center of symmetry CP. Although not depicted in the drawings, the circumferential surface 41a or the support part 100 of the idler body 41 is exposed on the inside of the gap 200R.

(Actions and Effects)

(1) The first end side 300 of the first wear plate 200P according to the embodiment includes the first end part 301 and the second end part 302. The first end part 301 is inclined with respect to the axial direction.

Because the crawler belt 50 and the first wear plate 200P abut at the pair of planar rail surfaces 51a and the arc-like first and second crawler belt contact surfaces 200a and 200b, both of the abutting portions exhibit surface contact in a region having a very small width approximately parallel to the axis AX. It is possible that these abutting portions may move in the circumferential direction over the first and second crawler belt contact surface 200a and 200b and the first wear plate 200P may wear away in the abutting portion.

If the first end part 301 in the first end side 300 is parallel to the axial direction, when the abutting portion moves over the first crawler belt contact surface 200a and reaches the first end part 301, the contact surface area of the crawler belt 50 and the first wear plate 200P becomes smaller and the abutting portion approximates a state of linear contact. As a result, the load pressure applied near the first end part 301 increases dramatically which may promote local wear near the first end part 301.

Accordingly, the first end part 301 is inclined with respect to the axial direction in the present embodiment. Consequently, linear contact between the crawler belt 50 and the first crawler belt contact surface 200a can be limited. Therefore, local wear near the first end part 301 can be limited because the load pressure applied near the first end part 301 is reduced.

The same result can also be achieved by making the second end part 302 inclined with respect to the axial direction.

(2) The second end side 400 of the second wear plate 200Q includes the third end part 401 and the fourth end part 402. The third end part 401 is inclined with respect to the axial direction.

Therefore, linear contact between the crawler belt 50 and the second crawler belt contact surface 200b can be limited. Therefore, local wear near the first end part 301 can be limited because the load pressure applied near the first end part 301 is reduced.

The same result can also be achieved by making the fourth end part 402 inclined with respect to the axial direction.

(3) The second end side 400 follows the first end side 300. The first end side 300 and the second end side 400 exhibit point symmetry on the basis of the center of symmetry CP.

Therefore, the profile of the first wear plate 200P and the second wear plate 200Q can be the same and productivity of the wear plate 200 can be improved.

Other Embodiments

Although embodiments of the present invention have been described so far, the present invention is not limited to the above embodiments and various modifications may be made within the scope of the invention.

(A) While the sprocket wheel 30 is disposed to the rear of the track frame 10 in the above embodiment, the sprocket wheel 30 may also be disposed in front of the track frame 10. Because the idler wheel 40 is preferably disposed on the opposite side of the sprocket wheel 30 with the track frame 10 interposed therebetween, the idler wheel 40 would be disposed to the rear of the track frame 10 in the above case.

(B) While the support part 100 is formed in a continuous manner around the entire circumference of the circumferential surface 41a in the above embodiment, the support part 100 may be formed intermittently in the circumferential direction.

(C) While the wear plate assembly 42 has the first cushioning member 205 and the second cushioning member 206 in the above embodiment, the first cushioning member 205 and the second cushioning member 206 may not be included.

(D) While the first abutting surface 200S and the second abutting surface 200T are both portions of the inner side surface Sd of the opening part 200d and abut with the protruding part 100 of the idler body 41 in the above embodiment, the present invention is not limited in this way. The first abutting surface 200S and the second abutting surface 200T may both be perpendicular to the axial direction and face each other.

Figure 6:
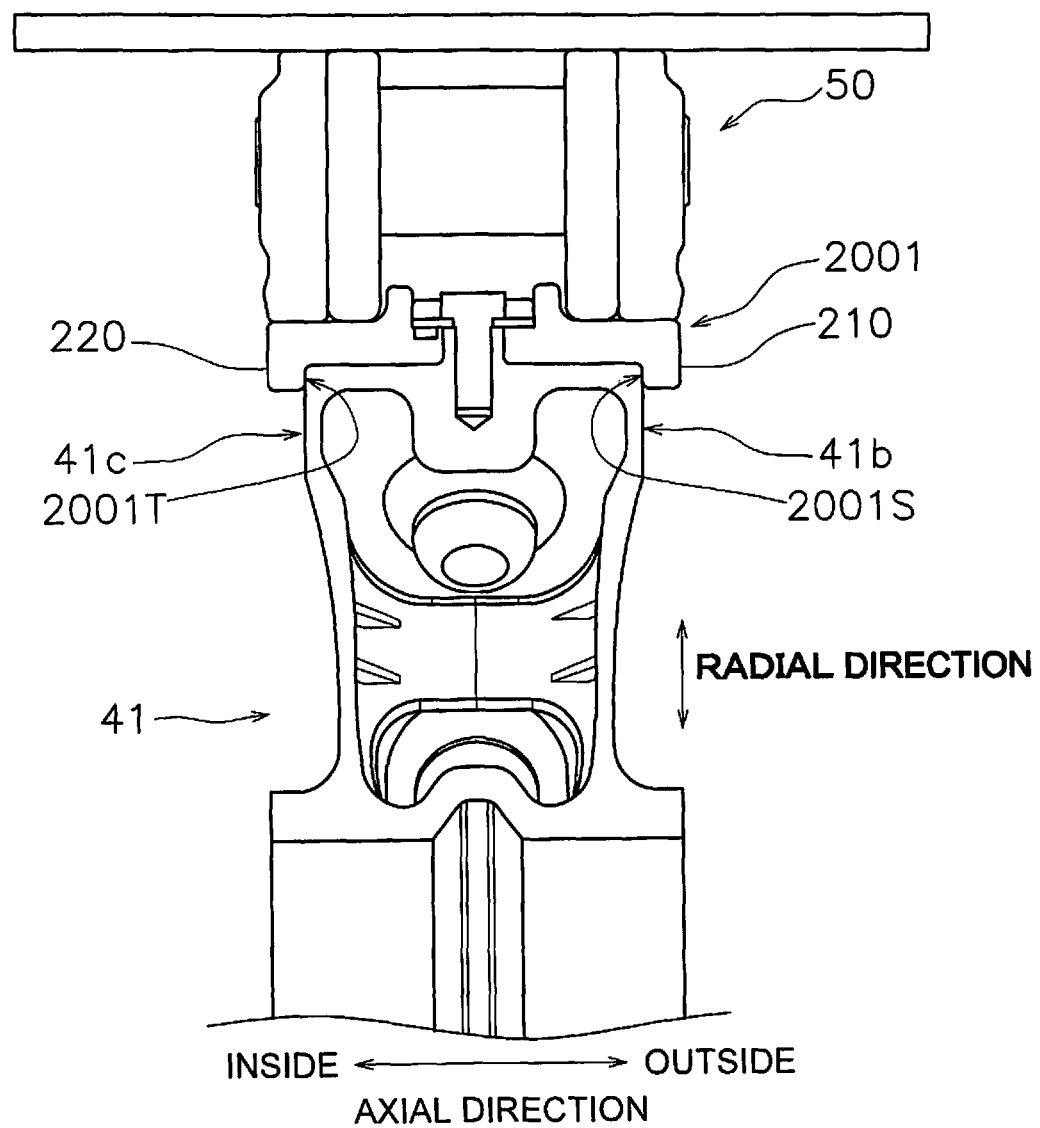
FIG. 6 is a sectional view of an idler wheel.

Therefore as illustrated in FIG. 6, the wear plate 2001 may have a first extension part 210 which extends over the outer surface 41b of the idler body 41, and a second extension part 220 which extends over the inner surface 41c of the idler body 41. In this case, the region of the first extension part 210 abutting the outer surface 41b is a first abutting surface 2001S and the region of the second extension part 220 abutting the inner surface 41c is a second abutting surface 2001T. The outer surface 41b and the inner surface 41c are the abutted surfaces.

In this way, because the size and shape of the first abutting surface 2001S and the second abutting surface 2001T can be designed freely when a portion of the wear plate 200 extends over the idler body 41, shifting of the wear plate 2001 can be suppressed more effectively.

Figure 7:
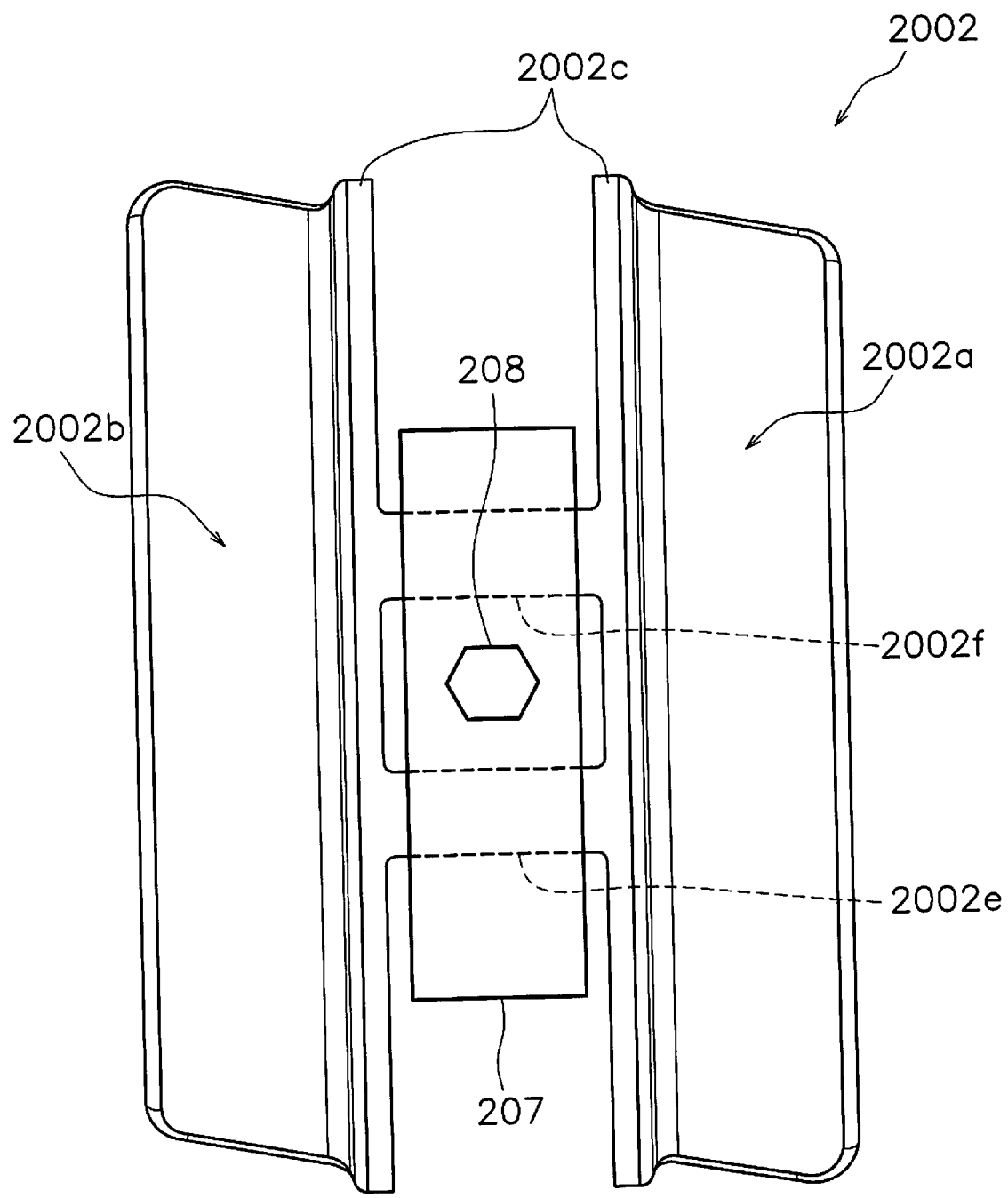
FIG. 7 is a plan view of a wear plate.

(E) While the wear plate 200 has the pair of first locking parts 200e and the pair of second locking parts 200f in the above embodiment, the present invention is not limited in this way. As illustrated by the wear plate 2002 shown in FIG. 7, the left-right pair of first locking parts 200e of the above embodiment may be joined together to obtain one first locking part 2002e. Similarly, the left-right pair of second locking parts 200f may be joined together to obtain one second locking part 2002f. In this case, the wear plate assembly 42 may be provided with one fixing member 207 fastened by one first fastening tool 208 as illustrated in FIG. 7. In this case, the wear plate 2002 has a first crawler belt contact surface 2002a having the same configuration as the first crawler belt contact surface 202a of the above embodiment and a second crawler belt contact surface 2002b having the same configuration as the second crawler belt 202b of the above embodiment. Also, the wear plate 2002 has a pair of guide parts 2002c connected to the first locking part 2002e and the second locking part 2002f.

Figure 8:
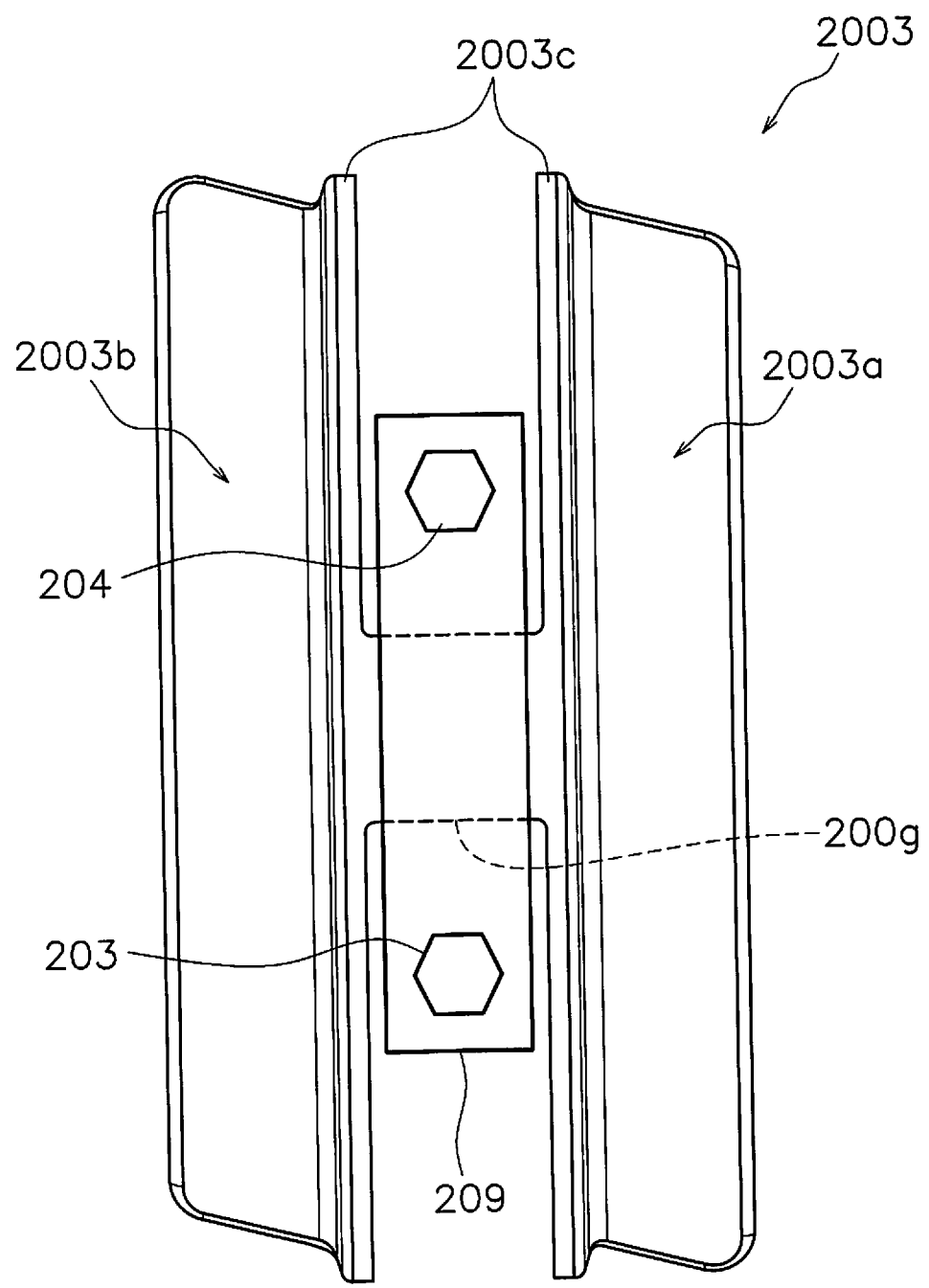
FIG. 8 is a plan view of a wear plate.

(F) While the wear plate 200 has the pair of first locking parts 200e and the pair of second locking parts 200f in the above embodiment, the present invention is not limited in this way. As illustrated in FIG. 8, the wear plate 2003 may have one locking part 200g. In this case, the wear plate assembly 42 may be provided with one fixing member 209 fastened by the first and second fastening tools 203 and 204. In this case, the wear plate 2003 has a first crawler belt contact surface 2003a having the same configuration as the first crawler belt contact surface 202a of the above embodiment and a second crawler belt contact surface 2003b having the same configuration as the second crawler belt 202b of the above embodiment. Also, the wear plate 2003 has a pair of guide parts 2003c connected to the locking part 200g.

Figure 9:
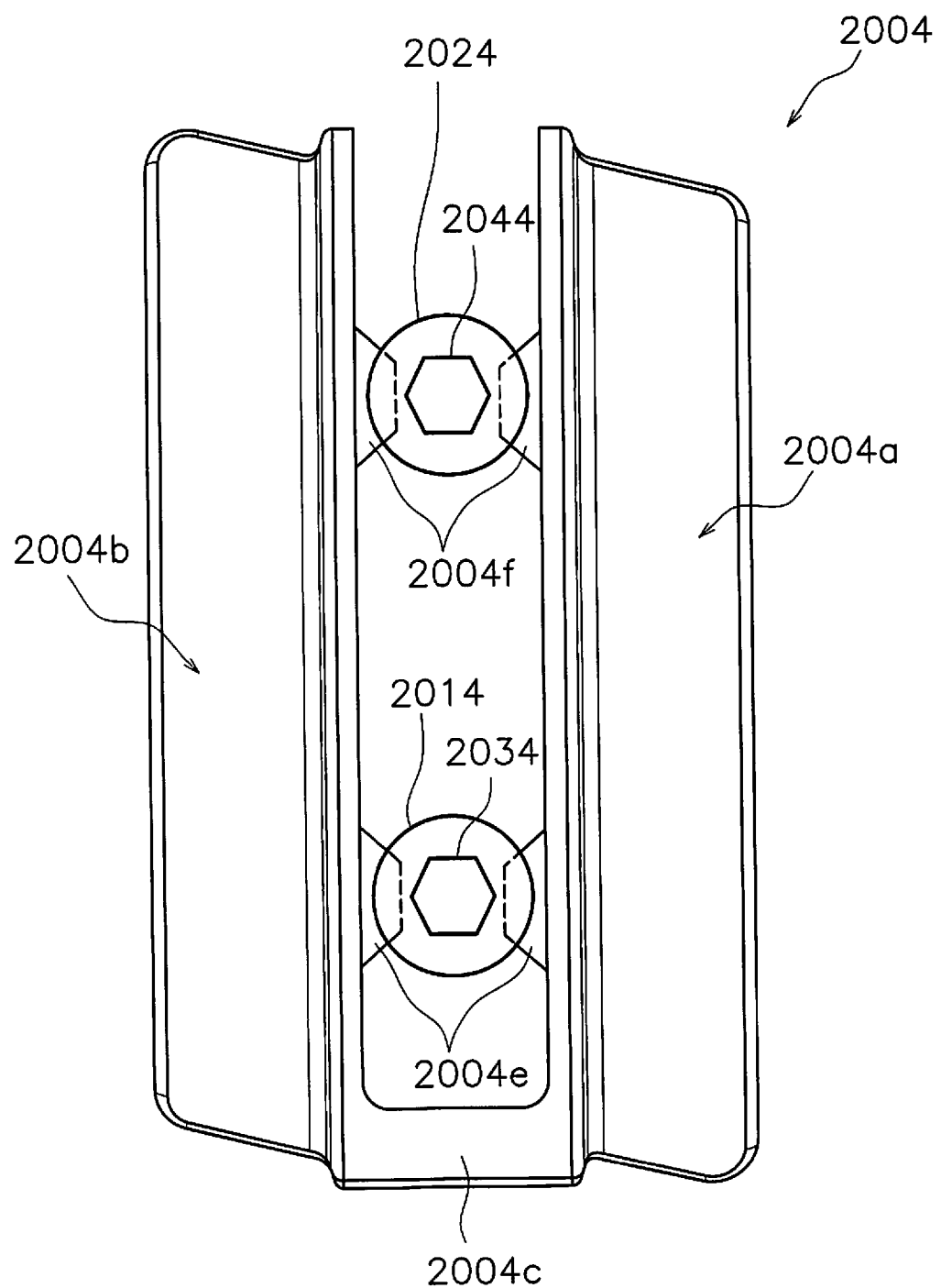
FIG. 9 is a plan view of a wear plate.

(G) While the wear plate 200 has the approximately rectangular-shaped opening part 200d in the middle as seen when viewing the idler body 41 from the radial direction in the above embodiment, the present invention is not limited in this way. While the wear plate 2002 shown in FIG. 7 and the wear plate 2003 shown in FIG. 8 both have an overall H-shape as seen in the radial direction, the wear plate 2004 may have an overall U-shape as illustrated in FIG. 9. The wear plate 2004 shown in FIG. 9 has a first crawler belt contact surface 2004a having the same configuration as the first crawler belt contact surface 202a of the above embodiment and a second crawler belt contact surface 2004b having the same configuration as the second crawler belt 202b of the above embodiment. Also, the wear plate 2004 has a pair of first locking parts 2004e having the same configuration as the pair of first locking parts 200e of the above embodiment and a pair of second locking parts 2004f having the same configuration as the pair of second locking parts 200f of the above embodiment. FIG. 9 also shows a first fixing plate 2014, a second fixing plate 2024, a first fastening tool 2034, and a second fastening tool 2044 that have the same configuration as the first fixing plate 201, the second fixing plate 202, the first fastening tool 203, and the second fastening tool 204, respectively, of the above embodiment.

(H) While the first fixing plate 201 is described as an example of a first fixing member in the above embodiment, the present invention is not limited in this way. The first fixing member may have any shape so long as the wear plate 200 can be fixed indirectly to the idler body 41 by the first fastening tool 203. Therefore, the first fixing member may have a round rod shape, a square rod shape, or a cubic shape instead of the planar shape. Accordingly, the second fixing plate 202 described as an example of the second fixing member may also have a shape other than the planar shape.

(I) While the first end side 300 of the first wear plate 200P has the first middle part 303 in the above embodiment, the first end side 300 may not have the first middle part 303 as illustrated by the wear plates 2002 and 2003 in FIGS. 7 and 8, respectively. Accordingly, the second end side 400 of the second wear plate 200Q may also be formed in the same way.

Figure 10:
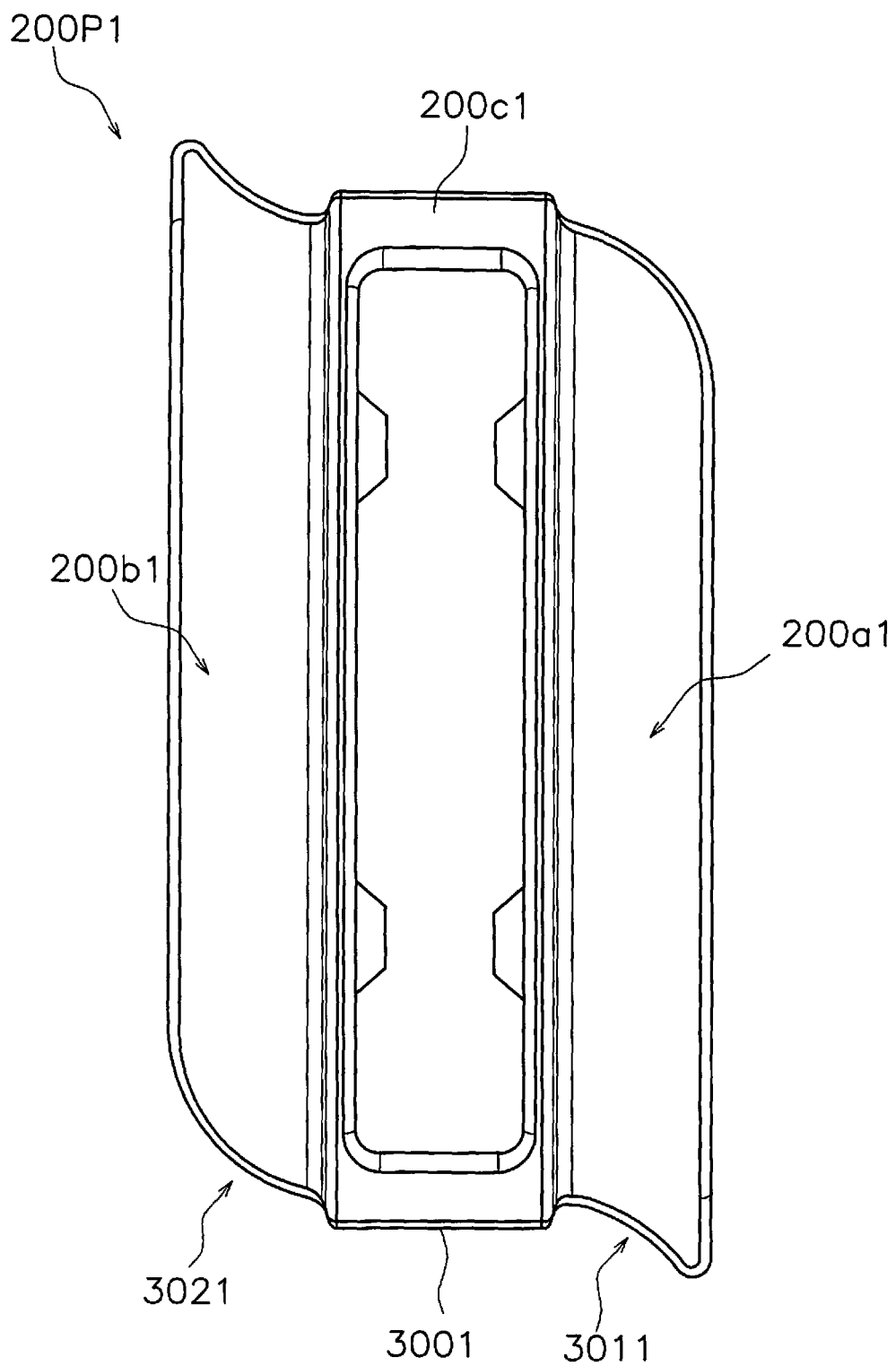
FIG. 10 is a plan view of a wear plate.
Figure 11:
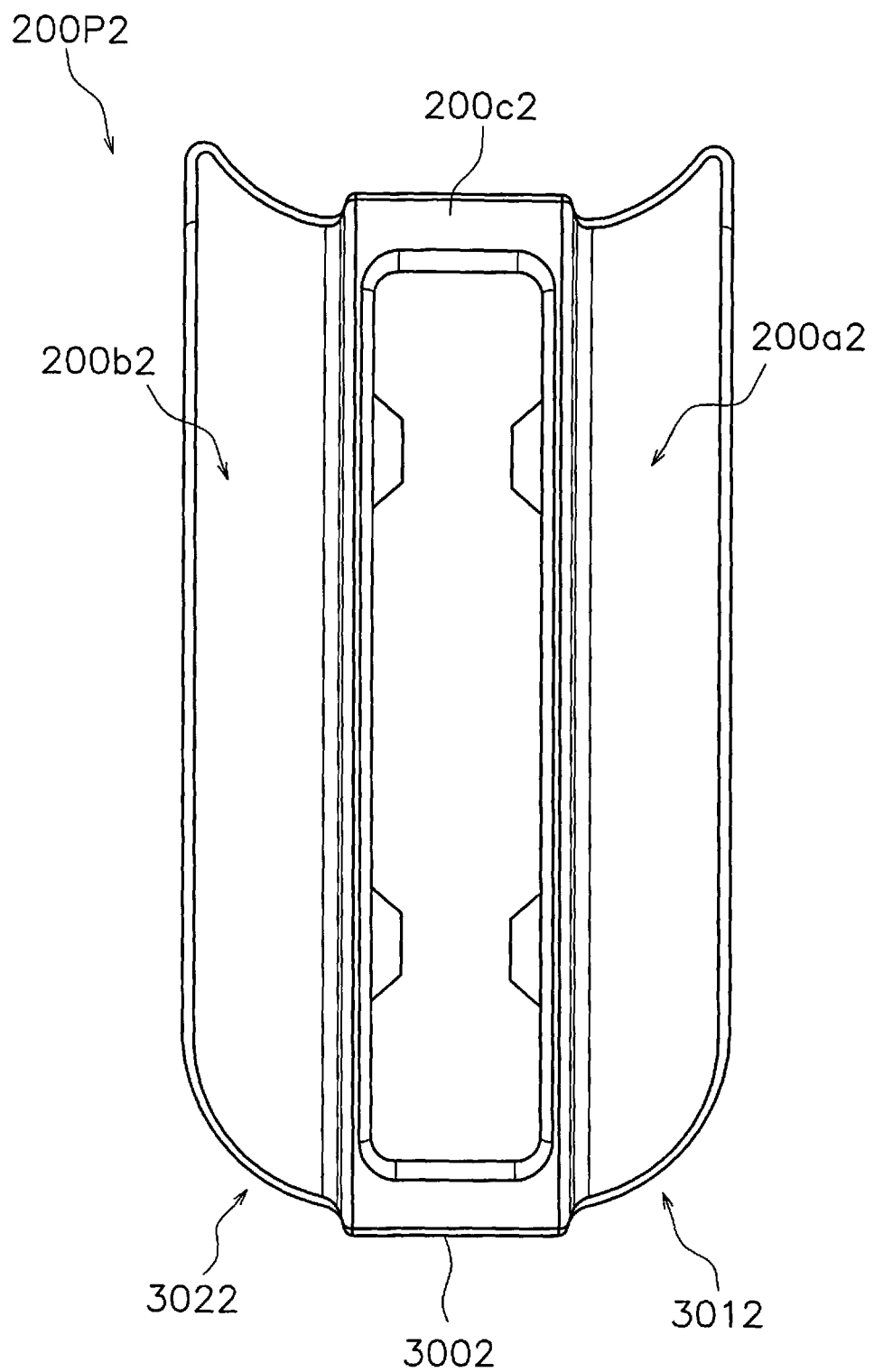
FIG. 11 is a plan view of a wear plate.

(J) While the first end part 301, the second end part 302, and the first middle part 303 of the first end side 300 of the first wear plate 200P are all formed in a linear manner in the above embodiment, the present invention is not limited in this way. As illustrated by the wear plate 200P1 in FIG. 10, the first end side 3001 may have a curved first end part 3011 and a curved second end part 3021. Alternatively, as illustrated by the wear plate 200P2 in 11, the first end side 3002 may have a curved first end part 3012 and a curved second end part 3022. While not shown in the drawings, the first middle part 303 of the first end side 300 of the first wear plate 200P shown in FIG. 5 may also be curved. Accordingly, the second end side 400 of the second wear plate 200Q may also be formed in the same way. The first wear plate 200P1 shown in FIG. 10 has a first crawler belt contact surface 200a1, a second crawler belt contact surface 200b1, and a guide part 200c1. The first wear plate 200P2 shown in FIG. 11 has a first crawler belt contact surface 200a2, a second crawler belt contact surface 200b2, and a guide part 200c2.

Figure 12:
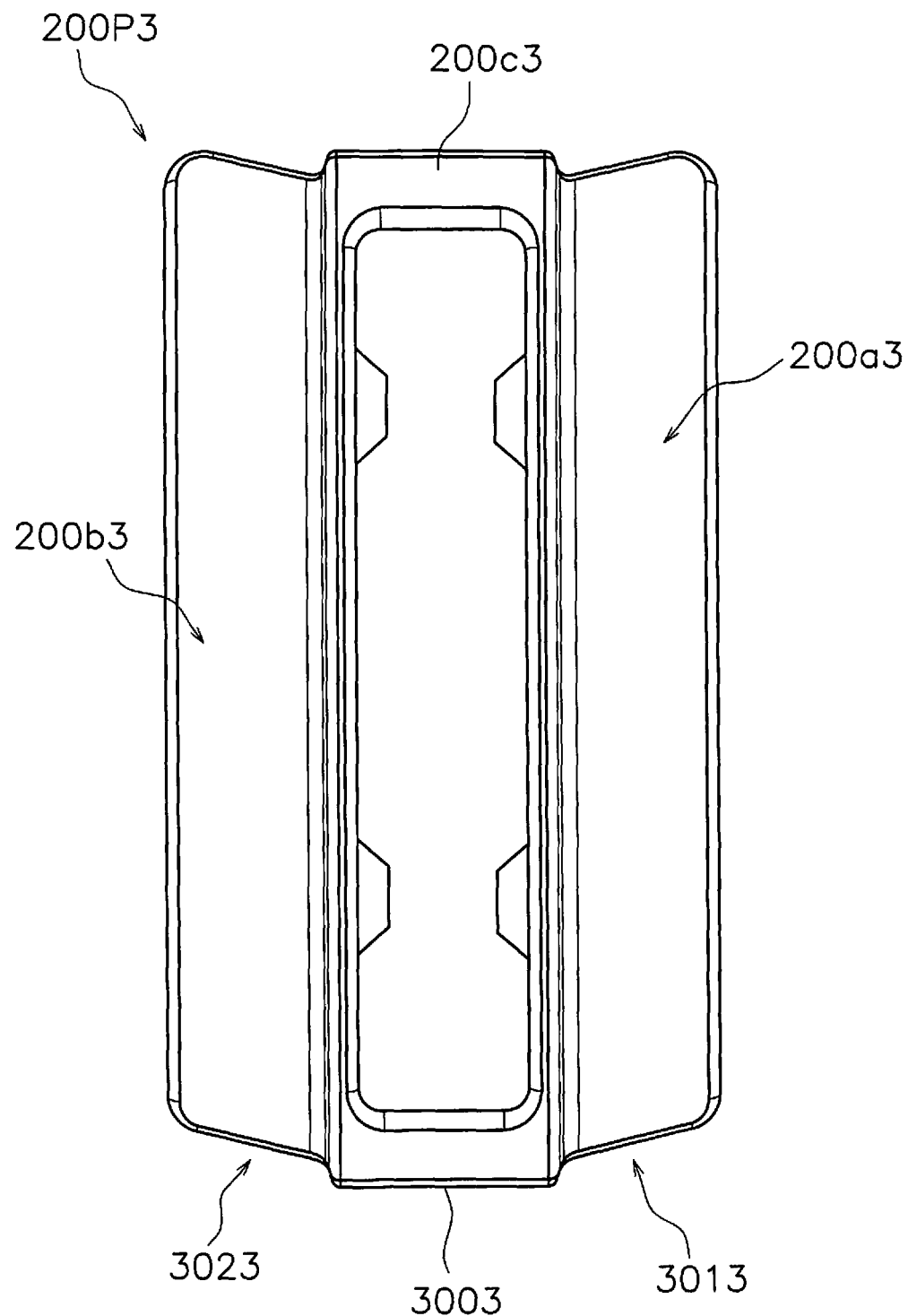
FIG. 12 is a plan view of a wear plate.

(K) While the second end part 302 of the first end side 300 of the first wear plate 200P is parallel to the first end part 301 in the above embodiment, the present invention is not limited in this way. As illustrated by the first wear plate 200P3 shown in FIG. 12, the second end part 3023 may not be parallel to the first end part 3013. The extension directions of the first end part 3013 and the second end part 3023 may be changed as appropriate. Accordingly, the second end side 400 of the second wear plate 200Q may also be formed in the same way. The first wear plate 200P3 shown in FIG. 12 has a first crawler belt contact surface 200$a$3, a second crawler belt contact surface 200$b$3, and a guide part 200$c$3.

(L) While the first end part 301 and the second end part 302 of the first end side 300 of the first wear plate 200P are both inclined with respect to the axial direction in the above embodiment, only one of the first end part 301 and the second end part 302 may be inclined with respect to the axial direction. Accordingly, the second end side 400 of the second wear plate 200Q may also be formed in the same way.

When the crawler-type travel device 1 is attached to the work machine and is traveling, the load pressure applied from the crawler belt 50 at the first crawler belt contact surface 200$a$ positioned further to the outside than the second crawler belt contact surface 200$b$, is likely to become high. As a result, when only one of the first end part 301 and the second end part 302 is inclined with respect to the axial direction, the first end part 301 positioned further to the outside than the second end part 302 is preferably inclined.

(M) While the first middle part 303 of the first end side 300 of the first wear plate 200P is formed parallel to the axial direction in the above embodiment, the present invention is not limited in this way. The first middle part 303 may be inclined with respect to the axial direction. In this case, the first end part 301, the first middle part 303, and the second end part 302 may continue in a straight line. Accordingly, the second end side 400 of the second wear plate 200Q may also be formed in the same way.

(N) While the first end side 300 and the second end side 400 exhibit point symmetry based on the center of symmetry CP in the above embodiment, the present invention is not limited in this way. The second end side 400 may be formed so as to approximately follow the first end side 300.

(O) While the idler wheel 40 guides the crawler belt 50 with the guide part 200$c$ and the idler body 41 of the idler wheel 40 abuts the first abutting surface 200S with the second abutting surface 200T in the above embodiment, the configuration of the idler wheel 40 is not limited in this way. The configuration of the idler wheel 40 may be changed as appropriate so long as the first end part 301 is inclined with respect to the axial direction in a wear plate 200 of at least one wear plate assembly 42 among the wear plate assemblies 42. Therefore, the methods disclosed Japanese Laid-Open Patent Publication No. H1-278890 or Japanese Laid-Open Patent Publication No. 2003-312557 may be used as the method for fixing the wear plate 200 to the idler body 41.

INDUSTRIAL APPLICABILITY

According to the present invention, an idler wheel and a crawler-type travel device which are able to limit local wear of the wear plates can be provided which is advantageous in the field of idler wheels and work machines.

What is claimed is:

1. An idler wheel configured to have a crawler belt wound thereon, the idler wheel comprising:
   a disk shaped idler body having a rotational center axis; and
   a plurality of wear plate assemblies disposed so as to encircle a circumferential surface of the idler body, each of the plurality of wear plate assemblies including a first wear plate and a second wear plate, the first and second wear plates being adjacent to each other in a circumferential direction of the idler body,
   each of the first wear plate and the second wear plate including a first crawler belt contact surface and a second crawler belt contact surface, the first crawler belt contact surface and the second crawler belt contact surface being spaced apart from each other in an axial direction of the idler body and extending in the circumferential direction, the axial direction being parallel to the rotational center axis,
   each of the first wear plates including
      a first end part that faces the second wear plate in the circumferential direction on the first crawler belt contact surface side of the first wear plate, and
      a second end part that faces the second wear plate in the circumferential direction on the second crawler belt contact surface side of the first wear plate,
      the first end part being inclined such that a position of the first end part in the circumferential direction varies as a position of the first end part in the axial direction varies when the first wear plate is viewed from outside in a plan view along a radial direction of the idler body.

2. The idler wheel described in claim 1, wherein each second end part is inclined with respect to the axial direction.

3. The idler wheel described in claim 1, wherein each second wear plate includes
   a third end part that defines an end on a first wear plate side of the first crawler belt contact surface, and
   a fourth end part that defines an end on the first wear plate side of the second crawler belt contact surface,
   the third end part being inclined with respect to the axial direction.

4. The idler wheel described in claim 3, wherein each fourth end part is inclined with respect to the axial direction in the plan view.

5. The idler wheel described in claim 4, wherein
   adjacent ones of the first end parts and the fourth end parts exhibit point symmetry about a center point when viewed from outside along the radial direction of the idler body, the center point being disposed between the first wear plate and the second wear plate in the circumferential direction, and
   adjacent ones of the second end parts and the third end parts exhibit point symmetry about the center point when viewed from outside along the radial direction of the idler body.

6. A crawler travel device including the idler wheel of claim 1, the crawler travel device further comprising:
   a track frame;
   a sprocket wheel disposed in front of or to the rear of the track frame; and
   a crawler belt wound onto the sprocket wheel and the idler wheel,
   the idler wheel being disposed on an opposite side from the sprocket wheel with the track frame interposed therebetween.

7. A wear plate configured to be attached to a disk shaped idler body having a rotational center axis, and to be abutted against a crawler belt, the wear plate comprising:
   a first crawler belt contact surface configured to extend in a circumferential direction of the idler body when the wear plate is attached to the idler body;
   a second crawler belt contact surface configured to extend in the circumferential direction of the idler body when the wear plate is attached to the idler body, the second crawler belt contact surface being spaced apart from the first crawler belt contact surface in an axial direction of the idler body when the wear plate is attached to the idler body; and a first end part arranged to face another wear plate attached to the idler body in the circumferential direction on the first crawler belt contact surface side of the wear plate, the first end part being inclined such that a position of the first end part in the circumferential direction varies as a position of the first end part in the axial direction varies when the wear plate is viewed from outside in a plan view along a radial direction of the idler body.

8. The idler wheel described in claim 1, wherein each of the first wear plates further includes a middle end part disposed axially between the first end part and the second end part, the middle end part extending parallel to the axial direction when viewed from outside along a radial direction of the idler body.

9. The wear plate described in claim 7, further comprising:

a guide part disposed between the first crawler belt contact surface and the second crawler belt contact surface, the guide part including at least one protrusion that extends in the circumferential direction and protrudes outward in the radial direction relative to the first crawler belt contact surface and the second crawler belt contact surface.

10. The wear plate described in claim 9, wherein the at least one protrusion of the guide part includes two protrusions that extend parallel to each other in the circumferential direction.

11. The wear plate described in claim 10, further comprising:

an opening part disposed between the two protrusions.

12. The wear plate described in claim 11, further comprising:

at least one pair of locking parts disposed between the two protrusions, the two locking parts of the at least one pair being configured to protrude toward each other in the axial direction across the opening.

13. The wear plate described in claim 11, wherein there are two pairs of the locking parts.

14. The wear plate described in claim 11, further comprising:

at least one locking part disposed between the two protrusions, the at least one locking part extending in the axial direction so as to span across the opening part.

15. The wear plate described in claim 7, further comprising:

a second end part arranged to face the other wear plate in the circumferential direction on the second crawler belt contact surface side of the wear plate, the second end part being inclined such that a position of the second end part in the circumferential direction varies as a position of the second end part in the axial direction varies when the wear plate is viewed from outside in a plan view along a radial direction of the idler body, the second end part being adjacent the first end part in the axial direction.

16. The wear plate described in claim 15, wherein the first end part and the second end part are linear.

17. The wear plate described in claim 16, wherein the second end part extends in a direction parallel to the first end part.

18. The wear plate described in claim 15, wherein the first end part and the second end part are curved.

19. The wear plate described in claim 15, wherein the first end part and the second end part extend in nonparallel directions.

20. The wear plate described in claim 15, wherein the wear plate further includes a middle end part disposed axially between the first end part and the second end part, the middle end part extending parallel to the axial direction when viewed from outside along a radial direction of the idler body.

* * * * *